UNITED STATES PATENT OFFICE.

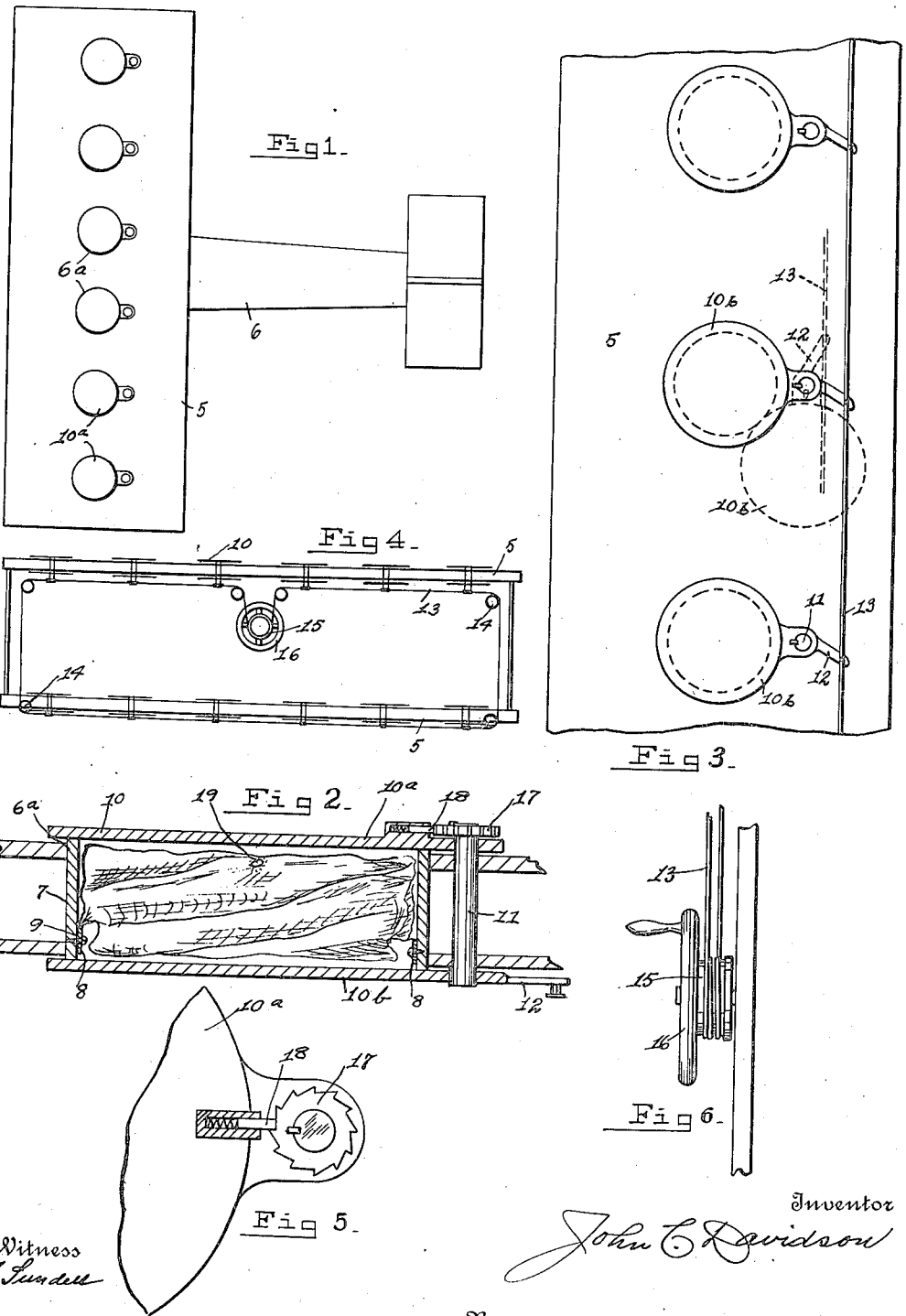

JOHN C. DAVIDSON, OF COLUMBUS, OHIO.

AEROPLANE-WING.

1,293,359.   Specification of Letters Patent.   Patented Feb. 4, 1919.

Application filed October 8, 1917. Serial No. 195,245.

*To all whom it may concern:*

Be it known that I, JOHN C. DAVIDSON, a citizen of the United States, residing at Columbus, in the county of Franklin and State of Ohio, have invented certain new and useful Improvements in Aeroplane-Wings, of which the following is a specification.

This invention relates to aeroplanes and, with regard to its more specific features, it has for an object to provide emergency means in conjunction with the wings or planes thereof for rendering the aeroplane capable of controlled self support, in the event of injury to one or more of its necessary members, while the latter are in operation.

Another object of the invention resides in an aeroplane wherein one, or more, of the wings or planes thereof is provided with valve controlled emergency parachute members, which are in the form of fabric receptacles, the latter being adapted to assume non-inflated positions during the normal operation of the machine, but upon the undue dropping of the latter, through misfortune to the wings or engine thereof, the valves controlling the parachute members may be quickly opened so as to permit of an inrush of air into said members, whereby the latter will be inflated to such an extent as to render the aeroplane buoyant and to maintain the equilibrium thereof, so that the same may be brought to a safe and gradual landing.

A further object resides in means for controlling the operation of the parachute members, so that the latter may be so governed as to be rendered partially ineffective after the same have been initially opened, whereby the aeroplane with which the parachute members are associated may be brought to a gradual and controlled landing.

With these and other objects in view, as it will appear as the description proceeds, the invention consists in the novel features of construction, combinations of elements and arrangements of parts, hereinafter fully described and particularly pointed out in the appended claims.

In the drawing wherein has been shown one of the preferred embodiments of the invention:

Figure 1 is a top plan view of an aeroplane showing the application of the present invention thereto.

Fig. 2 is a transverse enlarged vertical section taken through one of the containers for the parachute members.

Fig. 3 is an enlarged fragmentary bottom plan view.

Fig. 4 is a diagrammatic view showing the manner of arranging the cables to permit of the opening and closing of the parachute valve controls.

Fig. 5 is a detailed top plan view showing the ratchet mechanism for effecting the rotation of the upper valve member.

Fig. 6 is a detail side elevation of the cable drum and its controlling wheel.

Similar characters of reference designate corresponding parts throughout the several views of the drawing.

Referring more particularly to the drawing, the invention is shown as employed in connection with the wings 5 of an aeroplane 6, the latter, for purposes of illustration, has been conventionally shown as of the ordinary bi-plane type, but it will of course be understood that the invention is equally applicable to other types or forms of aeroplanes. The wings are provided throughout their length with a plurality of spaced openings $6^a$, any suitable number being provided, and the latter may be of any desired size. Positioned within the openings are a plurality of containers or casings and in each of which is carried one of the parachute members 7, comprising one of the essential parts of the invention. Each of the members 7 consists of a fabric bag or receptacle of silk or the like, having an open lower end, the edges 8 of which being firmly and substantially secured as at 9 to the inner surfaces of the containers, whereby when the receptacles are filled with air under considerable pressure the same will be effectively prevented from tearing loose from the coöperating wings thereof. Normally, due to the flexibility of the receptacles the latter will assume a collapsed or folded position and will thereby loosely rest within the containers or casings mounted within and between the surfaces of the wings 5, this construction prevents said members from normally interfering with the progress of said aeroplanes.

In order to inflate the parachute members or receptacles 7 each of the openings $6^a$ is normally covered with the valve members 10 in the form of pivoted plates, the latter being carried by the under surface of the wings and are adapted to be moved to a position uncovering the openings so as to permit air to enter the parachute members 7. Each of the plates is pivoted to revolve on a vertical axis 11, and is provided with crank extremities 12, to which is secured a cable or the like 13, the latter being trained over suitable pulleys 14, which are secured to the frame of the aeroplane. The central portion of the cable 13 is extended inwardly and is passed over a drum 15, which is rotated through the medium of a manually operated wheel 16. It will be seen that by rotating the wheel a relatively slight distance the cables 13 will be operated so as to oscillate the valve controls or members 10, whereby the containers carrying the parachute members will be uncovered so as to permit of the inrush of air into said parachutes to effect their inflation. It will be noted that the upper and lower valve members 10ª and 10ᵇ are pivoted to swing upon a common shaft 11, so that the movement of the lower valve member will impart equal movement to the upper when oscillated in one direction. To accomplish this simultaneous movement of the upper and lower valve members, the shafts 11 may be provided with ratchets 17, the teeth of the latter being engaged with spring pressed plungers 18 carried by the upper valve members 10ª. With this construction it will be noted that the valve members are free to rotate in unison in one direction only, as return movements on the part of the lower valve members 10ᵇ will not impart similar movement to the upper valve members, for a purpose to be hereinafter described.

Thus it will be evident that if certain main parts of the aeroplane should become broken or disabled when the machine is in flight the buoyancy and stability of the latter will be maintained by simply revolving the drum 15, so that the cable 13 will be pulled to effect the opening of the lower valve members 10ᵇ, and their connected upper members 10ª. This operation permits air to rush into the parachute members so as to inflate the latter, whereby the volume of air thus caught and confined will preserve the balance of the aeroplane and will serve to insure a safe and gradual descent of the same. If desired, reduced openings 19 may be formed in the receptacles so that air confined in the latter will be permitted to gradually escape, thus preventing the possibility of effecting a too abrupt stop of the aeroplane upon the inflation of the parachute members, as would be likely to occur if the openings 19 were omitted.

In order to more accurately control the descent of the aeroplane after the parachute members have been inflated, it will be seen that by operating the drum 15 that the cable 13 may be pulled to close or partially close the openings 6ª, whereby the action of the parachute members may be minutely controlled. It will be seen that by decreasing the amount of air which is permitted to rush into the parachute members that the descent of the aeroplane may be readily governed so that a safe landing may be obtained. The upper valve members will not close in unison with the lower members as the ratchet construction 17 and 18 will prevent this movement.

Having described the invention what is claimed as new and patentable is:

1. In an aeroplane, combination with the wings thereof, of a plurality of receptacles carried by said wings, foldable parachute members adapted to occupy each of said receptacles, means for releasing said members from said receptacles, comprising for each receptacle a pair of upper and lower swinging plate members, a shaft common to both of said plates and by means of which the latter are oscillated, a ratchet wheel mounted upon the upper end of said shaft, a spring pressed dog movable into engagement with the teeth of said ratchet, and cable means connected with said plates to oscillate the latter to positions covering and uncovering said receptacles and through the coöperation of a shaft carried ratchet mechanism to effect the oscillation of said upper plate to a receptacle uncovering position only.

2. In an aeroplane, the combination with a plane thereof, a foldable parachute member situated in an opening formed in said plane, of means for retaining said member within said opening and to permit of its release therefrom, comprising a pair of spaced oscillatory upper and lower plate members normally situated to cover said opening, cable means connected with said opening, cable means to oscillate the latter to open-plate members to oscillate the latter to open-ing uncovering positions, and means coöperative with the upper plate member to permit the latter to be oscillated to an opening uncovering position only.

In testimony whereof I affix my signature.

JOHN C. DAVIDSON.